(12) United States Patent
Miller

(10) Patent No.: US 10,345,426 B2
(45) Date of Patent: Jul. 9, 2019

(54) DEVICE STATE ESTIMATION UNDER PEDESTRIAN MOTION WITH SWINGING LIMB

(71) Applicant: Apple Inc., Cupertino, CA (US)

(72) Inventor: Isaac Thomas Miller, El Granada, CA (US)

(73) Assignee: Apple Inc., Cupertino, CA (US)

( * ) Notice: Subject to any disclaimer, the term of this patent is extended or adjusted under 35 U.S.C. 154(b) by 544 days.

(21) Appl. No.: 14/843,894

(22) Filed: Sep. 2, 2015

(65) Prior Publication Data

US 2017/0059602 A1 Mar. 2, 2017

(51) Int. Cl.
*G01S 5/02* (2010.01)
*G01C 21/16* (2006.01)
*G01C 22/00* (2006.01)

(52) U.S. Cl.
CPC ............ *G01S 5/0294* (2013.01); *G01C 21/16* (2013.01); *G01C 21/165* (2013.01); *G01C 22/006* (2013.01)

(58) Field of Classification Search
CPC ........ G01P 3/02; G01S 5/0294; G01C 21/165
USPC ...................................... 73/504.02
See application file for complete search history.

(56) References Cited

U.S. PATENT DOCUMENTS

| 5,926,131 A | 7/1999 | Sakumoto et al. |
| 9,079,060 B2 * | 7/2015 | Hong |
| 2001/0015123 A1 | 8/2001 | Nishitani |
| 2012/0271121 A1 * | 10/2012 | Della Torre ........... A61B 5/024 600/301 |
| 2012/0274508 A1 * | 11/2012 | Brown ..................... G04F 10/00 342/357.25 |
| 2013/0106684 A1 * | 5/2013 | Weast ................. G06F 19/3481 345/156 |
| 2013/0289932 A1 * | 10/2013 | Baechler .............. A61B 5/0002 702/141 |
| 2013/0328726 A1 | 12/2013 | Riley et al. |
| 2014/0240567 A1 | 8/2014 | Saito et al. |
| 2015/0073717 A1 * | 3/2015 | Hsu ...................... A61B 5/0803 702/19 |

(Continued)

FOREIGN PATENT DOCUMENTS

| CN | 101226061 | 7/2008 |
| WO | WO 2013/184493 | 12/2013 |

OTHER PUBLICATIONS

Xiao et al., "Robust pedestrian dead reckoning (R-PDR) for arbitrary mobile device placement", 2014 international Conference on indoor Positioning and Indoor Navigation, Oct. 27-30, 2014, 10 pages.

(Continued)

*Primary Examiner* — Jamel E Williams
(74) *Attorney, Agent, or Firm* — Fish & Richardson P.C.

(57) ABSTRACT

Systems, methods, devices and computer-readable storage mediums are disclosed for device state estimation under pedestrian motion with swinging limb. In some implementations, a method comprises: determining, by a device, that the device is attached to a swinging limb based on a sensor signal; determining, by the device, a rotational velocity component due to the swinging limb based on the sensor signal and limb parameters; estimating, by the device, device velocity; and determining, by the device, user velocity based on the device velocity and the rotational velocity component.

20 Claims, 8 Drawing Sheets

(56) References Cited

U.S. PATENT DOCUMENTS

| | | | | |
|---|---|---|---|---|
| 2015/0081061 A1* | 3/2015 | Aibara | ............... | A61B 5/1122 |
| | | | | 700/91 |
| 2015/0122018 A1* | 5/2015 | Yuen | ............... | G01B 21/16 |
| | | | | 73/384 |
| 2015/0371024 A1* | 12/2015 | Kim | ............... | G06F 21/32 |
| | | | | 726/18 |
| 2015/0382086 A1* | 12/2015 | Kim | ............... | A61B 5/1116 |
| | | | | 340/870.07 |
| 2016/0278700 A1* | 9/2016 | Lee | ............... | A61B 5/02438 |
| 2016/0287168 A1* | 10/2016 | Patel | ............... | A61B 5/02416 |

OTHER PUBLICATIONS

International Search Report and Written Opinion in International Application No. PCT/US2016/020235, dated Jun. 3, 2016, 13 pages.

* cited by examiner

DEVICE STATE ESTIMATION UNDER PEDESTRIAN MOTION WITH SWINGING LIMB

TECHNICAL FIELD

This disclosure relates generally to dead reckoning (DR) and device state estimation.

BACKGROUND

Computing an accurate radio navigation-based position solution in challenging signal environments such as urban canyons and areas of dense foliage can be difficult. In these challenging signal environments, fewer signals are available, and those signals that are available tend to yield less accurate measurements on a device due to environmental attenuation. One approach to improving the availability and quality of position solutions in challenging signal environments is to combine observations of radio navigation signals with input from other sensors or signals that measure some aspect of user or antenna motion between or during the measurement of radio navigation signals. The additional information improves the position solution by subtracting out antenna motion between epochs of radio navigation measurements, effectively allowing multiple epochs of measurements to be statistically combined to reduce error.

One approach to improving the availability and quality of position solutions blends measurements of radio navigation signals in a Kalman Filter with numerical integration of accelerometer and/or rate gyroscope measurements or the like to correct for antenna motion between epochs. For this approach, the numerical integration component is often called an inertial navigation system (INS) or DR component. In this approach, the DR component is used to subtract antenna motion between epochs so multiple epochs of radio navigation measurements may be combined. However, because the DR component estimates motion from one epoch to the next, the DR component accumulates errors over time as that motion is combined over multiple epochs.

It is desirable in pedestrian motion estimation to minimize accumulated pedestrian motion errors by making the DR component more accurate. One way to do this is to select a motion model that allocates adequate degrees of freedom to model the object undergoing motion without assigning unnecessary degrees of freedom. A typical motion model that does a poor job at this task might assign a constant velocity to a user regardless of the motion activity class (e.g., driving, walking). Assigning a constant velocity will result in poor DR performance when, for example, a walking pedestrian with swinging arms holds the device (and hence its sensors) in hand. In this case, the motion of the device is not equal to the motion of the user. In fact, the device may at times move twice as fast as the user. At other times, the device may appear stationary while the user is walking.

SUMMARY

Systems, methods, devices and non-transitory, computer-readable storage mediums are disclosed for device state estimation under pedestrian motion with swinging limb.

In some implementations, a method comprises: determining, by a device, that the device is attached to a swinging limb based on a sensor signal; determining, by the device, a rotational velocity component due to the swinging limb based on the sensor signal and limb parameters; estimating, by the device, device velocity; and determining, by the device, user velocity based on the device velocity and the rotational velocity component.

In some implementations, a device comprises: one or more sensors; one or more processors; and memory coupled to the one or more processors and configured to store instructions, which, when executed by the one or more processors, causes the one or more processors to perform operations comprising: determining that the device is attached to a swinging limb based on a sensor signal provided by the one or more sensors; determining a rotational velocity component due to the swinging limb based on the sensor signal and limb parameters; estimating device velocity; and determining user velocity based on the device velocity and the rotational velocity component.

Particular implementations disclosed herein provide one or more of the following advantages. A set of techniques are disclosed that robustly estimate when a user is swinging a device (e.g., in hand or pants pocket) and the state of the user's arm or leg relative to the user's body while swinging. The set of techniques results in a DR component that is more accurate, which in turn results in a more accurate device state estimate (e.g., position, velocity).

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

The implementations disclosed herein robustly estimate a device state under pedestrian motion with a swinging limb. The disclosed implementations determine that the user is swinging a device in hand (or in a leg pocket) by detecting periodicity in one or more sensor signals and knowledge of the orientation of the device in a reference coordinate frame (e.g., geodetic, local level coordinate frame). The state of the user's swinging limb relative to their body is identified through knowledge of the device orientation and basic tenets of pedestrian motion. A DR component models the motion of the user and the motion of the user's swinging limb to determine the velocity of the user in the reference coordinate frame.

Figure 1:
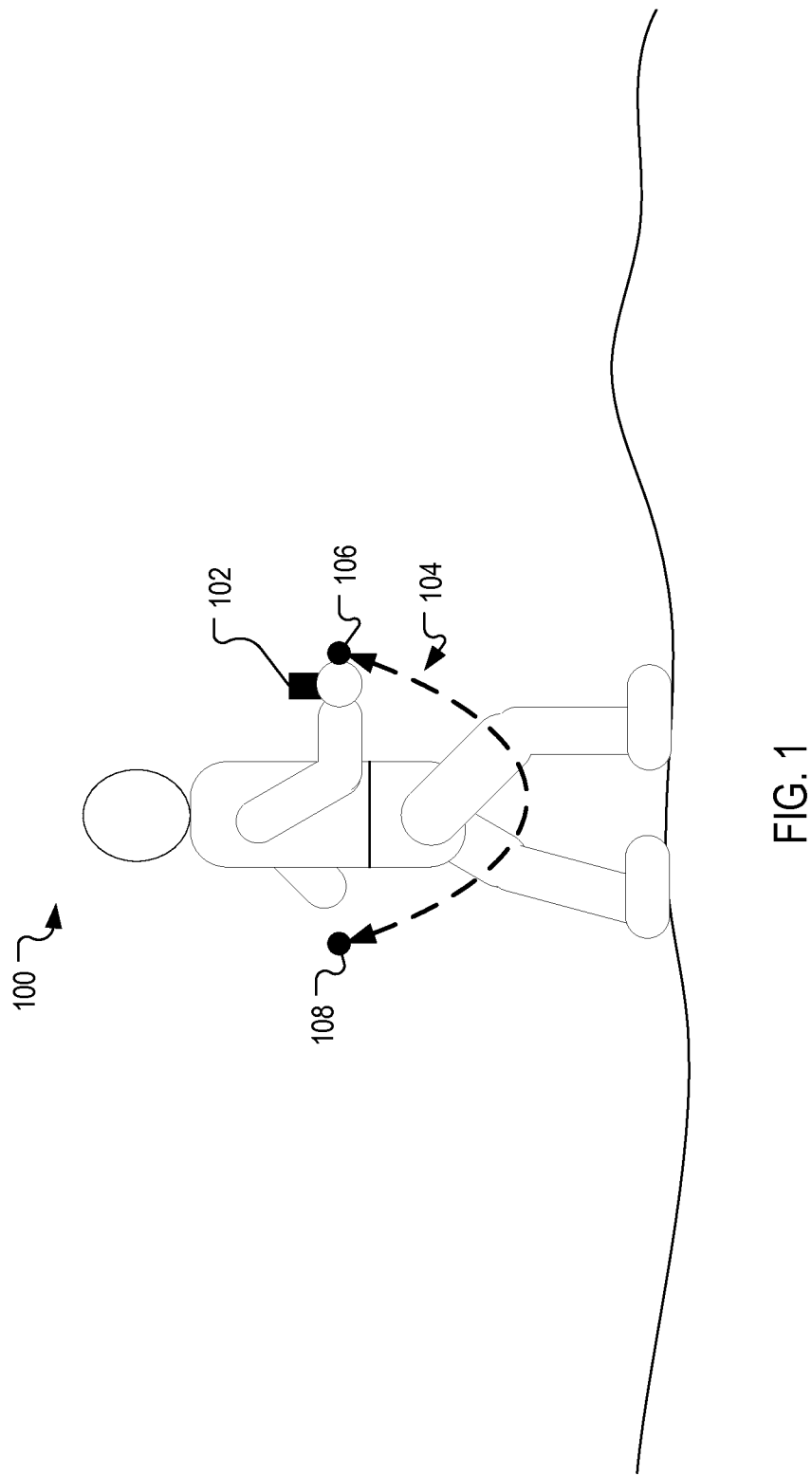
FIG. 1 illustrates periodic motion of a hand held device, according to an implementation.

FIG. 1 illustrates periodic motion of a hand-held device, according to an implementation. In the example shown mobile device 102 (e.g., a smart phone, wrist watch) is held or worn by user 100. The magnitude or modulus of an acceleration signal provided by accelerometers of mobile device 102 tends to be periodic when user 100 walks with mobile device 102 in hand because walking is a fundamentally periodic activity. If user 100 is swinging her arm along arm swing path 104, an interesting periodicity feature is the local minimum acceleration magnitude, where mobile device 102 is undergoing the least acceleration of the entire motion cycle. The local minimum acceleration magnitude occurs twice per arm swing motion: once when the arm swings to apex 106 in front of user 100 and once when the arm of user 100 swings to apex 108 behind user 100. At apexes 106, 108 (the terminus points of arm swing path 104), the estimated speed of the device will be approximately equal to the speed of the user's body. Accordingly, the times when apexes 106, 108 of arm swing path 104 are reached provide desirable times to apply pedestrian motion constraints (e.g., stride length) or device orientation constraints because small errors in predicting at this time do not result in significant changes of device orientation or motion. This yields a more stable DR component for pedestrian motion, resulting in significant improvement to the device state estimation.

Example System

Figure 2:
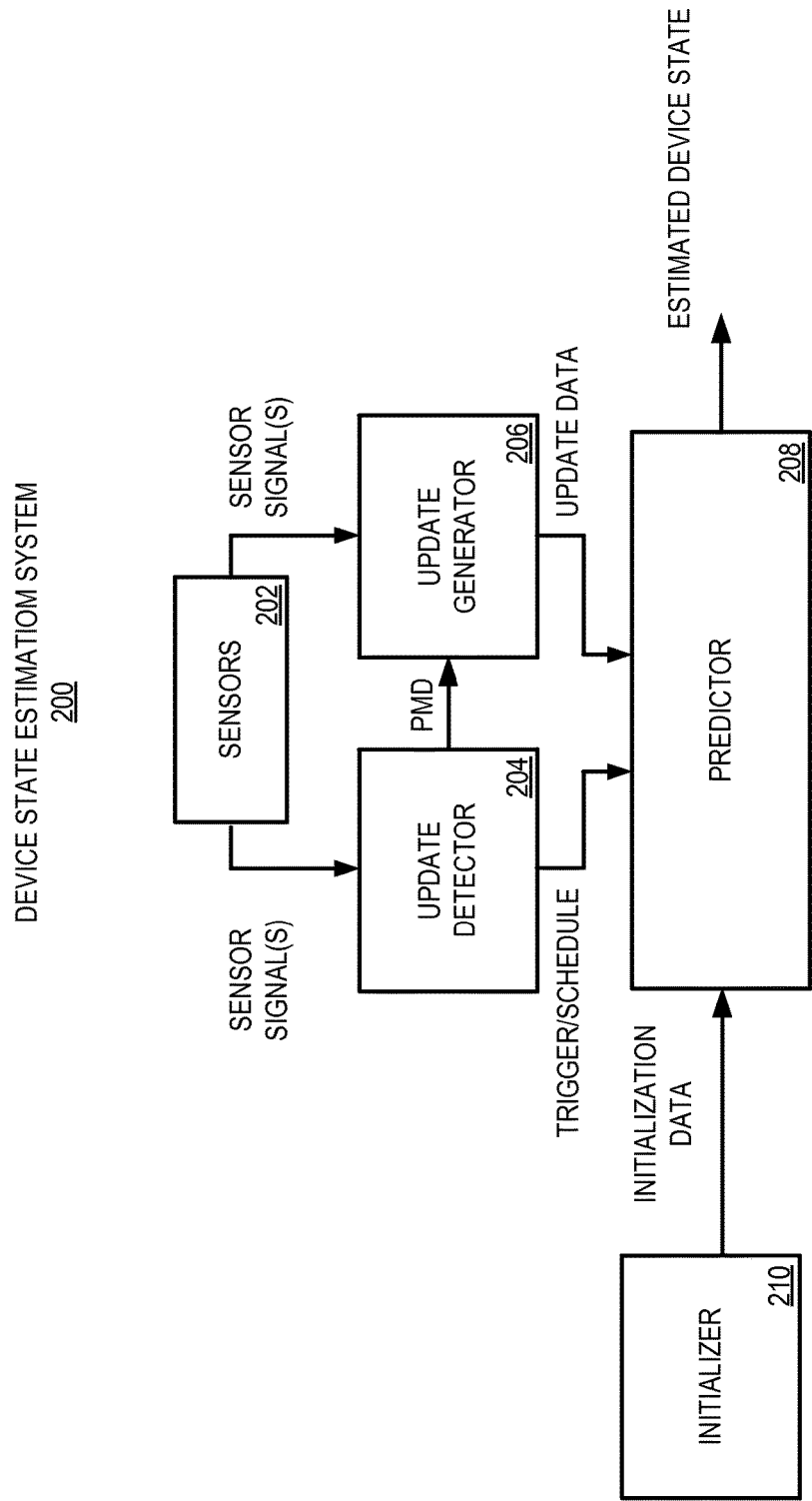
FIG. 2 is a block diagram of an example system for estimating device state, according to an implementation.

FIG. 2 is a block diagram of an example system for estimating device state, according to an implementation. In this example implementation, system 200 can include sensors 202, update detector 204, update generator 206, predictor 208 and initializer 210.

Sensors 202 can include accelerometers, rate gyroscopes, barometers, magnetometers and the like. Sensors 202 provide sensor signals to update detector 204 and update generator 206. Update detector 204 detects and tracks periodicity in the sensor signals and triggers or schedules pedestrian periodic motion constraint updates in predictor 208, as described in reference to FIG. 3. Update generator 206 provides parameters to predictor 208 that are needed to apply pedestrian periodic constraint updates, and also provides observable inputs for device state updates, as described in reference to FIG. 4.

Initializer 210 provides initialization data to predictor 208 to ensure a good initial condition within a linearization boundary of a correct solution. In some implementations, position and velocity measurements from Global Navigation Satellite System (GNSS) and/or WiFi access point (AP) data can be used to generate initial conditions for position and velocity. An initial condition for device orientation or attitude can be derived by least squares fitting a device attitude quaternion to reference vector observations using, for example, a Wahba problem solver, such as the well-known q-method. The q-method can use a variety of reference vector observations in Earth-fixed and device-fixed reference frames and generate, for example, an Earth-Centered-Earth-Fixed (ECEF) to device quaternion or rotation matrix (e.g., direction cosine matrix). Some example measurements/models include but are not limited to: Earth gravity model (Earth-fixed), gravity vector from accelerometer (device-fixed), GNSS data (Earth-fixed), principal component of accelerometer data (device-fixed), International Geographic Reference Field (IGRF) data (Earth-fixed) and magnetometer data (device-fixed).

In some implementations, predictor 208 generates an estimate of a device state, including XYZ device position, XYZ device velocity, device attitude using a 4-element quaternion, XYZ device rate gyro biases and XYZ device accelerometer biases. These 16 states can be estimated using, for example, a Kalman Filter formulation, which is updated with pedestrian periodic motion constraint updates, as described in reference to FIGS. 4-6.

Figure 3:
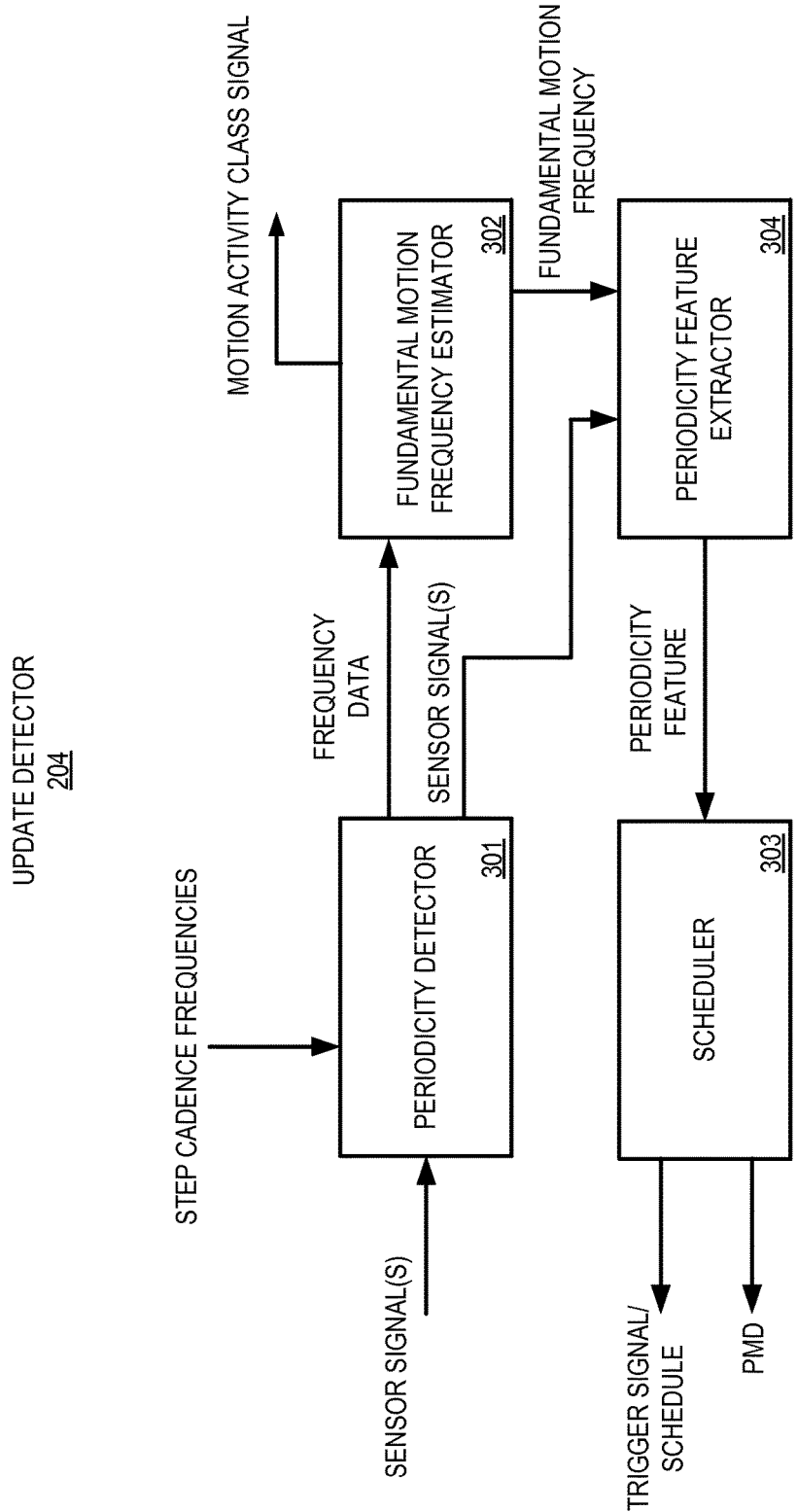
FIG. 3 is a block diagram of the example update detector shown in FIG. 2, according to an implementation.

FIG. 3 is a block diagram of the example update detector 204 shown in FIG. 2, according to an implementation. In this example implementation, the sensor signal is an acceleration vector provided by a three-axis accelerometer. Other sensor signals can also be used such as a rate gyroscope signal, which can, for example, be used to determine the periodic rotation of the arm.

In some implementations, update detector 204 can include periodicity detector 301, fundamental motion frequency estimator 302, periodicity extractor 304 and scheduler 308. Periodicity detector 301 receives one or more sensor signals and step cadence frequencies. For example, detector 301 can receive an acceleration vector or magnitude. If an acceleration vector is provided detector 301 can calculate the norm of the vector to obtain the magnitude or modulus. In some implementations, detector 301 can pre-process the sensor signal by applying a low pass or band pass filter to remove unwanted frequencies outside the range of frequencies of interest determined by the step cadence frequencies (e.g., 0.45-3.15 Hz). In some implementations, a moving average or median filter can be applied to the sensor signals. In some implementations, a non-causal finite window Gaussian filter can be applied to the sensor signals.

In some implementations, detector 301 can include a sliding window frequency transform (e.g., Discrete Fourier Transform (DFT)) that is applied to a set of samples of the sensor signal to detect periodicity in the sensor signal. Frequency data generated by detector 301 is provided to fundamental motion frequency estimator 302, which determines the instantaneous fundamental motion frequency of the sensor signal. For example, if the length of the sliding window used in detector 301 is at least as long as several fundamental periods of the user's arm swing, the lowest statistically-non-zero frequency bin output by the frequency transform can be selected as the fundamental motion frequency. In some implementations, an instantaneous fundamental motion frequency can also be determined as a weighted average over significantly non-zero bin frequencies. In some implementations, the frequency transform can be implemented using a Fast Fourier Transform (FFT).

The instantaneous fundamental motion frequency can be provided as input to periodicity feature extractor 304, which extracts a periodicity feature from one or more segments of the sensor signal that are each approximately equal in duration to the fundamental motion period of the observed periodic sensor signal. In this example, where the sensor signal is the acceleration magnitude, the periodicity feature is the local minimum acceleration magnitude. The local minimum acceleration magnitude occurs at apexes 106, 108, as described in reference to FIG. 1. If the fundamental motion frequency is $f_s$, then the fundamental period of the signal is $T_s=1/f_s$ and the local minimum acceleration magnitude occurs every $T_s$ seconds. There can be a number of local acceleration minima. For example, a pedestrian with a device swinging in his hand tends to reach a local acceleration minimum each time one of the user's feet is as far off the ground as possible. Sometimes the strongest frequency is the user's step frequency (e.g., the frequency of the user's footfalls) and sometimes it is the user's gait frequency (e.g., the frequency of the user's left footfalls).

In some implementations, the observed periodic signal (e.g., acceleration magnitude) need not be periodic at all times and the fundamental motion frequency may change over time. In these cases, a phase tracking algorithm (e.g., a phase-locked loop (PLL), delay-locked loop (DLL), Kalman Filter) can use the fundamental motion frequency to track the phase of the sensor signal so that the periodicity feature can be extracted from the sensor signal.

Scheduler 303 is informed each time the periodicity feature is extracted from the sensor signal. Scheduler 303 is configured to send a periodic motion detection (PMD) signal to update generator 206 and a trigger signal/schedule to predictor 208. The trigger signal and/or a schedule (e.g., a predicted time of the next periodicity feature extraction) can be used to trigger an update in predictor 208. For example, with knowledge of the most recent arm swing apex and the fundamental motion frequency (arm swing motion frequency), the time of the next apex can be predicted and used to schedule pedestrian periodic motion constraint updates. Accordingly, pedestrian periodic motion updates can be generated by update generator 206 and applied by predictor 208 each time the arm reaches an apex. At each apex 106, 108, the rotational accelerations are substantially zero and the linear velocity of the body of user 100 becomes the dominant force detected by the accelerometers. Therefore, the trigger/schedule signal indicates an optimum time to apply pedestrian periodic motion constraints to ensure that the pedestrian periodic motion constraint updates will not introduce unintended errors to the estimated device state provided by predictor 208.

Figure 4:
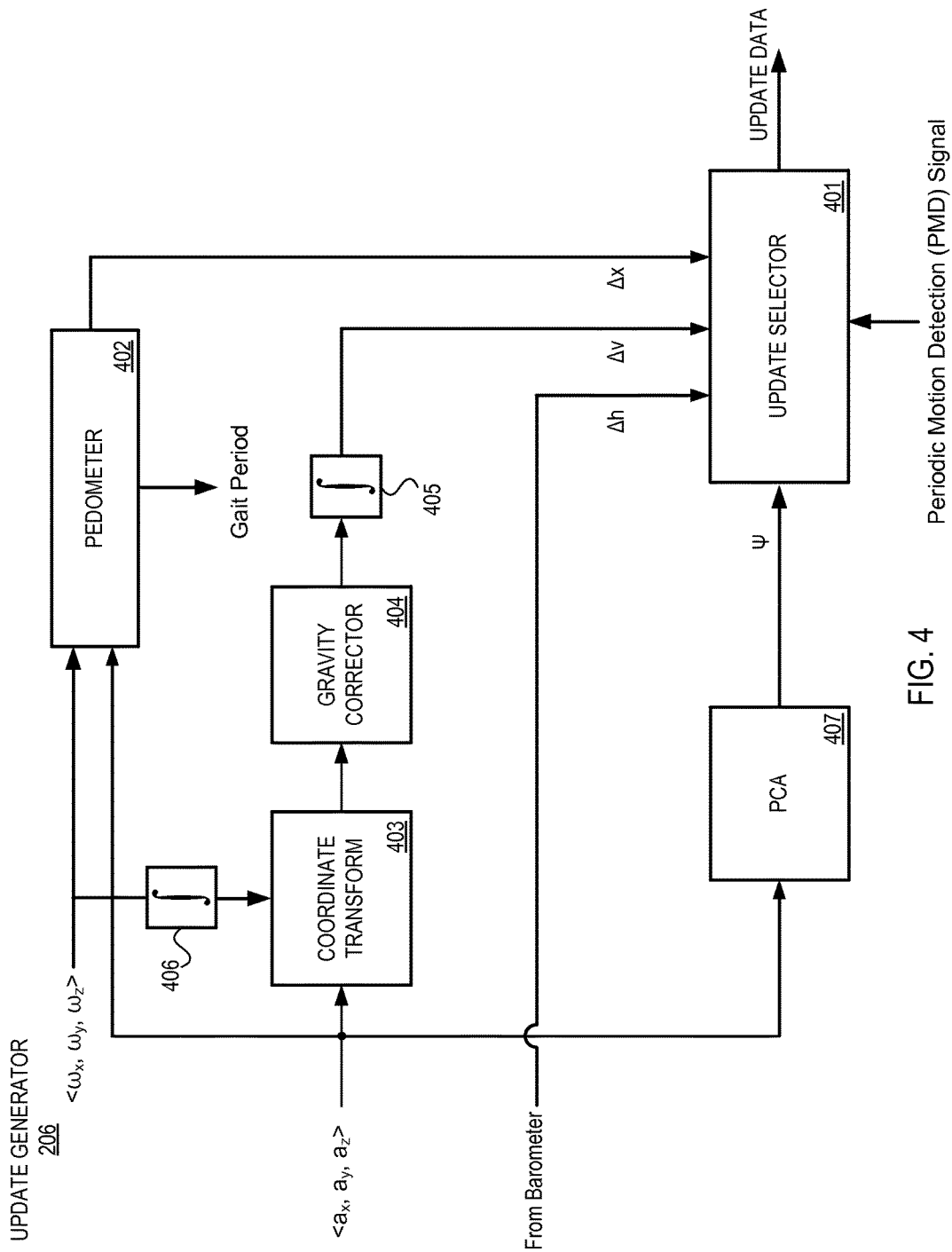
FIG. 4 is a block diagram of the example update generator shown in FIG. 2, according to an implementation.

The PMD signal can be used by update generator 206 to select update data based on whether or not periodic motion is detected by update detector 204, as described in reference to FIG. 4.

In some implementations, fundamental motion frequency estimator 302 provides a motion activity class signal, which can be used to determine that the user is walking and swinging a limb. For example, the periodicity detector can be run on both accelerometer data and rate gyroscope data to determine whether, for example, a pitch component has a stronger periodicity (e.g., more energy in the frequency domain) than a vertical acceleration component, as described in Xiao et al., "Robust pedestrian dead reckoning (R-PDR) for arbitrary mobile device placement," 2014 International Conference on Indoor Positioning and Indoor Navigation, (27-30 Oct. 2014), p. 7. Upon such determination, a pedestrian motion model that models arm swing motion can be invoked, as described in reference to FIGS. 5 and 6.

FIG. 4 is a block diagram of the example update generator 206 shown in FIG. 2, according to an implementation. In this example implementation, update generator 206 can include update selector 401, pedometer 402, coordinate transform 403, gravity corrector 404, integrators 405, 406 and PCA module 407.

In some implementations, pedometer 402 receives an acceleration data vector from 3-axis accelerometers. The norm of the acceleration vector $<a_x, a_y, a_z>$ can be calculated to generate an acceleration modulus or magnitude. For example, the magnitude $a_{mag}$ of an acceleration vector $\vec{a} = <a_x, a_y, a_z>$ provided by a 3-axis (x, y, z axes) accelerometers is given by, $$a_{mag} = |\vec{a}| = \sqrt{a_x^2 + a_y^2 + a_z^2}. \qquad [1]$$

The acceleration magnitude can be used by pedometer 402 to determine user step frequency and speed s, as described in, for example, U.S. Patent Publication No. US 2013/0085677A1, for "Techniques for Improved Pedometer Readings," filed Sep. 30, 2011, which patent publication is incorporated by reference herein in its entirety. In some implementations, a device rotation rate vector $<\omega_x, \omega_y, \omega_z>$ from a 3-axis rate gyroscope on the device can be input to pedometer 402. The device rotation rate vector $<\omega_x, \omega_y, \omega_z>$ can be used, for example, in step detection in addition to the acceleration vector.

In some implementations, update generator 206 sends pedestrian periodic motion constraint updates to predictor 208 at a specified frequency (e.g., 1 Hz) or when no periodic motion is detected, as determined by, for example, the PMD signal provided by update detector 204. For example, if no periodic motion is detected, then updates can include a change in altitude $\Delta h$ across a set period of time (e.g., user gait period). The change in altitude can be determined by a change in barometric pressure determined by a barometer sensor. The change in velocity $\Delta v$ can be calculated from the acceleration vector after the acceleration vector has been transformed from a device coordinate frame to a reference coordinate frame (e.g., ECEF or geodetic, local level) by coordinate transform 403, corrected for gravity by gravity corrector 404 and integrated over the last set period of time by integrator 405. In some implementations, coordinate transform 403 is implemented by a quaternion using techniques known in the art.

In some implementations, update generator 206 sends pedestrian periodic motion constraint updates to predictor 208 at a specified frequency (e.g., 1 Hz) or when periodic motion is detected, as determined by, for example, the PMD signal provided by update detector 204. For example, if periodic motion is detected, then pedestrian periodic motion constraint updates include a change in horizontal position $\Delta x$ across the specified time period, a change in altitude $\Delta h$ across the specified time period, a change in velocity $\Delta v$ across the specified time period and a primary direction $\psi$ of user motion across the specified time period. The primary direction $\psi$ can be generated by, for example, PCA module 407 using principal component analysis on the acceleration vector.

For example, accelerometers on the device can report accelerations that are a function of user acceleration, gravity, some minor effects (e.g., centripetal and Coriolis acceleration due to the rotation of the Earth) and noise. In some implementations, a set of acceleration measurements can be used to determine a direction of travel by: 1) collecting a set of device acceleration measurements over a specified time interval (e.g., a pre-set time window or the last step period or the last gait period); 2) determining the sum of nearly-constant external accelerations (gravity, centripetal, Coriolis) by, e.g., averaging acceleration measurements over several periods; 3) removing the nearly-constant external accelerations by subtracting them from each measurement; 4) computing the sample covariance for the residual gravity-subtracted accelerations computed in step 3; and 5) computing a singular value decomposition of the sample covariance computed in step 4. The singular vector with the largest corresponding singular value is the direction of greatest non-gravity acceleration over the period and is a good measurement of user direction of travel.

In some implementations, $\Delta x$ can be generated by integrating an average user speed determined by pedometer 402. The average user speed can be determined by, for example, multiplying an average step frequency by the stride length of the user.

In some implementations, update selector 401 implements a software switch that selects the appropriate motion constraint updates to send to predictor 208 based on the PMD signal received from update detector 204.

Figure 5:
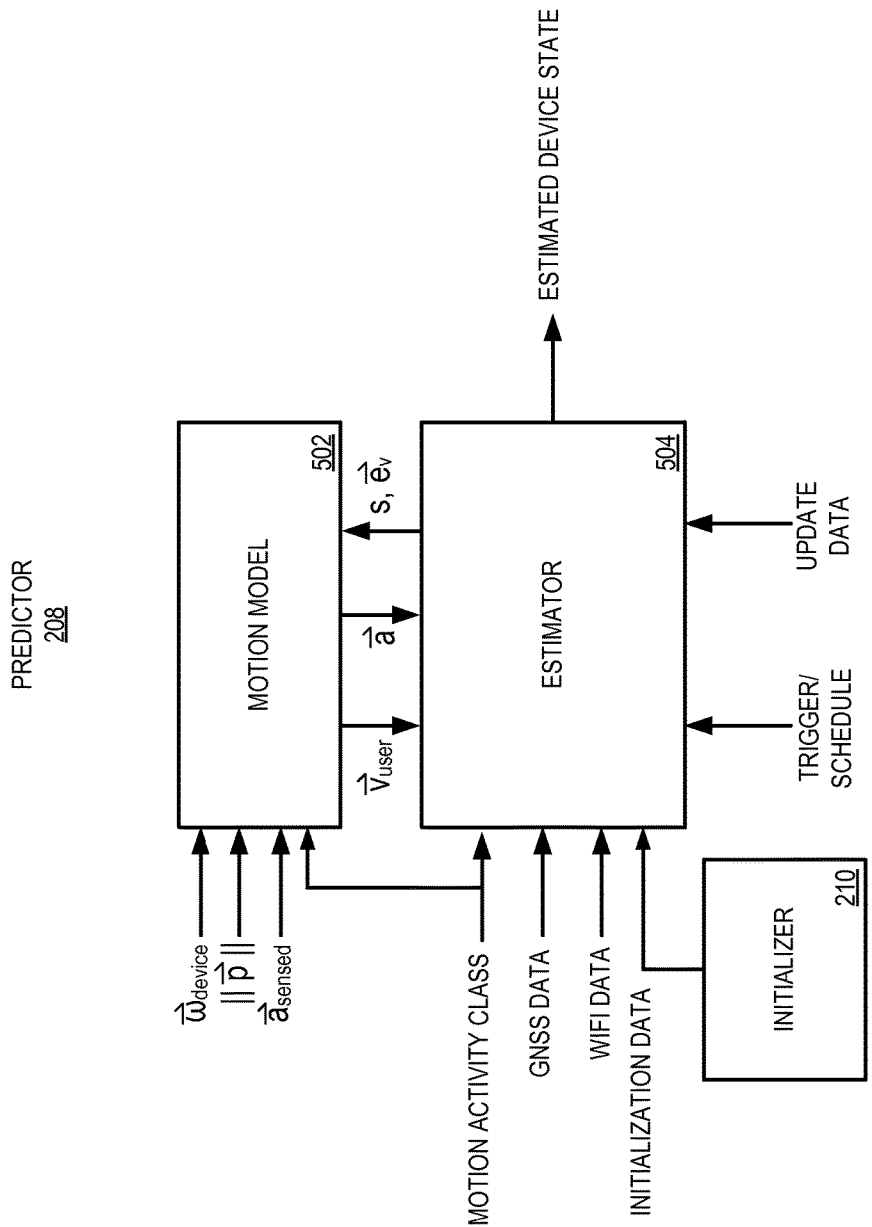
FIG. 5 is a block diagram of the example predictor shown in FIG. 2, according to an implementation.

FIG. 5 is a block diagram of the example predictor 208 shown in FIG. 2, according to an implementation. In this example implementation, predictor 208 can include motion model 502, estimator 504 and initializer 210.

In some implementations, motion model 502 implements a path-coordinate formulation for user acceleration given by, $$\vec{a} = s \cdot (\vec{\omega}_{user} \times \vec{e}_v) + \dot{s} \cdot \vec{e}_v, \quad [2]$$

where s is the speed of the user, $$\dot{s} = \frac{ds}{dt}.$$

is the rate of change of user speed, $\vec{\omega}_{user}$ is the rotation rate of the user and $\vec{e}_v$ is a unit tangent vector to a path that the user is traveling along. The user rotation rate $\vec{\omega}_{user}$ can be derived from device rotation rate, which can be obtained from rate gyroscopes on the device. The unit tangent vector $\vec{e}_v$ and user speed s can be obtained from estimator 504. The user acceleration $\vec{a}$ can be used as an input to estimator 504 as an update to, for example, correct for antenna motion between measurement time epochs. In one implementation, the user acceleration in equation [2] is input to a numerical integrator to predict how the user has moved from one measurement time epoch to the next. In one implementation, this is implemented as part of the prediction step of estimator 504.

In some implementations, the rate of change of user speed $$\dot{s} = \frac{ds}{dt}$$

can be driven by a small white noise process in estimator 504. When the user and device share an approximately rigid connection, the human preference for low acceleration puts limits on the rate of change of user speed $$\dot{s} = \frac{ds}{dt}.$$

For example, in many use cases where a device-fixed assumption holds, $$\dot{s} = \frac{ds}{dt} \approx 0.$$

If $$\dot{s} = \frac{ds}{dt} \approx 0,$$

all of the user motion can be predicted with just the user rotation rate $\vec{\omega}_{user}$, which yields significant improvements in the DR component performance over 6 degrees of freedom (6-DOF) formulations that require more accurate accelerometers. The path-coordinate formulation of equation [2] also yields significant improvements in DR component performance over constant velocity models, which cannot predict changes in direction. Some example use cases where the device-fixed assumption holds includes when the user is driving and the device is docked, when the user is walking while looking at the screen of the device or when the device is in the user's back pants pocket.

In some implementations, pedestrian motion model 502 receives a motion activity class signal indicating a motion class as described in reference to FIG. 2. If the motion activity class signal indicates that the user is swinging a limb attached to the device, then pedestrian motion model 502 generates user velocity $\vec{v}_{user}$ given by $$\vec{v}_{device} = \vec{v}_{user} + \vec{v}_{rotation} = \vec{v}_{user} + (\vec{\omega}_L \times \vec{p}) \quad [3]$$

where $\vec{\omega}_L$ is a limb rotation rate vector and $\vec{p}$ is a limb position vector with an origin at the center of rotation of the limb (e.g., a shoulder or hip) to the device.

In equation [3], $\vec{v}_{user}$ is the desired user velocity and $\vec{v}_{device}$ is observed via, for example, GNSS data. In some implementations, $\vec{\omega}_L$ can be determined from the device rotation rate $\vec{\omega}_{device}$ measured directly via rate gyroscopes, where it is observed that the periodic component of the device rotation rate sensed by the rate gyros is substantially due to the swinging limb. Knowledge of device orientation can be determined by, for example, a magnetometer vector $\vec{m}$ and gravitational vector $\vec{g}$. The device orientation can then be used to transform $\vec{\omega}_L$ (e.g., device coordinates) into the same reference coordinate frame as $\vec{v}_{user}$ and $\vec{v}_{device}$ (e.g., geodetic, local level coordinates).

To form the limb position vector $\vec{p}$ a sensed acceleration vector (with gravity subtracted) can be used to identify the extreme limb directions, which occur at the beginning and end (terminus points) of the limb swing, as described in reference to FIG. 1. In some implementations, the exact limb direction can be determined by interpolating between the terminus points, as described in reference to FIG. 6. The limb length $\|\vec{p}\|$ may be entered by the user, set as a default based on average physiological features of humans or estimated in estimator 504. With the limb parameters known, the DR component can be equipped with a more accurate model of device motion that separates $\vec{v}_{device}$ into a user velocity $\vec{v}_{user}$ component and a rotational component $\vec{v}_{rotation} = (\vec{\omega}_L \times \vec{p})$ due to a swinging limb. Solving equation [3] for user velocity $\vec{v}_{user}$ gives, $$\vec{v}_{user} = \vec{v}_{device} - \vec{v}_{rotation} = \vec{v}_{device} - (\vec{\omega}_L \times \vec{p}) \quad [4]$$

The user velocity of equation [4] can be input into estimator 504 as an update to, for example, correct for antenna motion between measurement time epochs.

In some implementations, estimator 504 is implemented as a Kalman Filter. The state vector can include xyz device position, xyz device velocity, device attitude using a 4-element quaternion describing device rotation from reference coordinate axes to device coordinate axes, xyz device rate gyro biases and xyz device accelerometer biases. In some implementations, the observables can include GNSS and WiFi data. GNSS data (e.g., latitude, longitude) can include data from any GNSS including but not limited to the Global Position System (GPS). WiFi data can be provided by a positioning service that provides AP data (e.g., locations of beacons, routers). In some implementations, the user velocity can be included in the Kalman filter state vector. In such a formulation, the measured user velocity of equation [4] is compared to the estimated user velocity in the Kalman filter measurement step.

An example Kalman Filter that uses GNSS and WiFi observables and motion context is described in U.S. Pat. No.

8,615,253 for "State Estimation Using Motion Context and Multiple Observation Types," issued Dec. 24, 2013, which patent is incorporated by reference herein in its entirety. In some implementations, the position states are represented in a geodetic coordinate frame and the velocity states are represented in a geodetic, local-level coordinate frame, such as North-East-Up (NEU). Accordingly, in some implementations pedestrian periodic motion constraint updates may have to be transformed from device coordinate frame to one or more different reference coordinate frames before they can be applied in the estimator 504.

In some implementations, constraints are incorporated into the Kalman filter as measurement updates of the form 0=h(x)+w, where x is the current state estimate, h(x) is the possibly-nonlinear function that describes the constraint space and w is the tolerance variable whose noise statistics (e.g., measurement noise covariance matrix R) describe the statistical degree to which constraint violation is tolerated. For example, to constrain vertical velocity to zero, h(x) would be a function that projects the current velocity estimate onto the local vertical direction and the square root of the diagonal of the R matrix would be the expected 1-sigma violation of that constraint. Other constraint types would have different h(x) functions and different R values.

In some implementations, the path-coordinate acceleration of equation [2] is used as part of the prediction step of the Kalman filter. During a prediction step, the acceleration is input to a numerical integrator to describe the change in the velocity and position estimates from one time to the next. As such, the process noise matrix Q can be set with noise parameters for the path-coordinate acceleration model, which might include, for example, noise terms that describe rate gyro and accelerometer measurement noise and also typical statistics for changes in user speed.

In some implementations, changes in $\|\vec{p}\|$ can be modeled as a percentage or fraction of the average arm (or leg) length (e.g., ¾ the average arm/leg length), which models a majority of the velocity contribution due to the limb swing. If the user is walking, $\|\vec{p}\|$ can be modeled as the average arm length (most users keep their arms more or less straight while walking). If the user is running, $\|\vec{p}\|$ can be modeled as $$\frac{\sqrt{2}}{2}.$$

average arm length (most users jog with their arms bent roughly at 90°). In some implementations, walking or jogging can be detected by, for example, a difference in step frequencies or acceleration magnitudes. In some implementations, $\|\vec{p}\|$ can be estimated in the Kalman filter. In some implementations, $\|\vec{p}\|$ can be determined from accelerometer and rate gyro data. For example, the centripetal acceleration due to rotational motion is $\omega^2 \cdot \|\vec{p}\|$ where ω can be provided by rate gyros. The centripetal part of the acceleration as measured by the accelerometers can be isolated by subtracting out gravity and function fitting on the residual.

Figure 6:
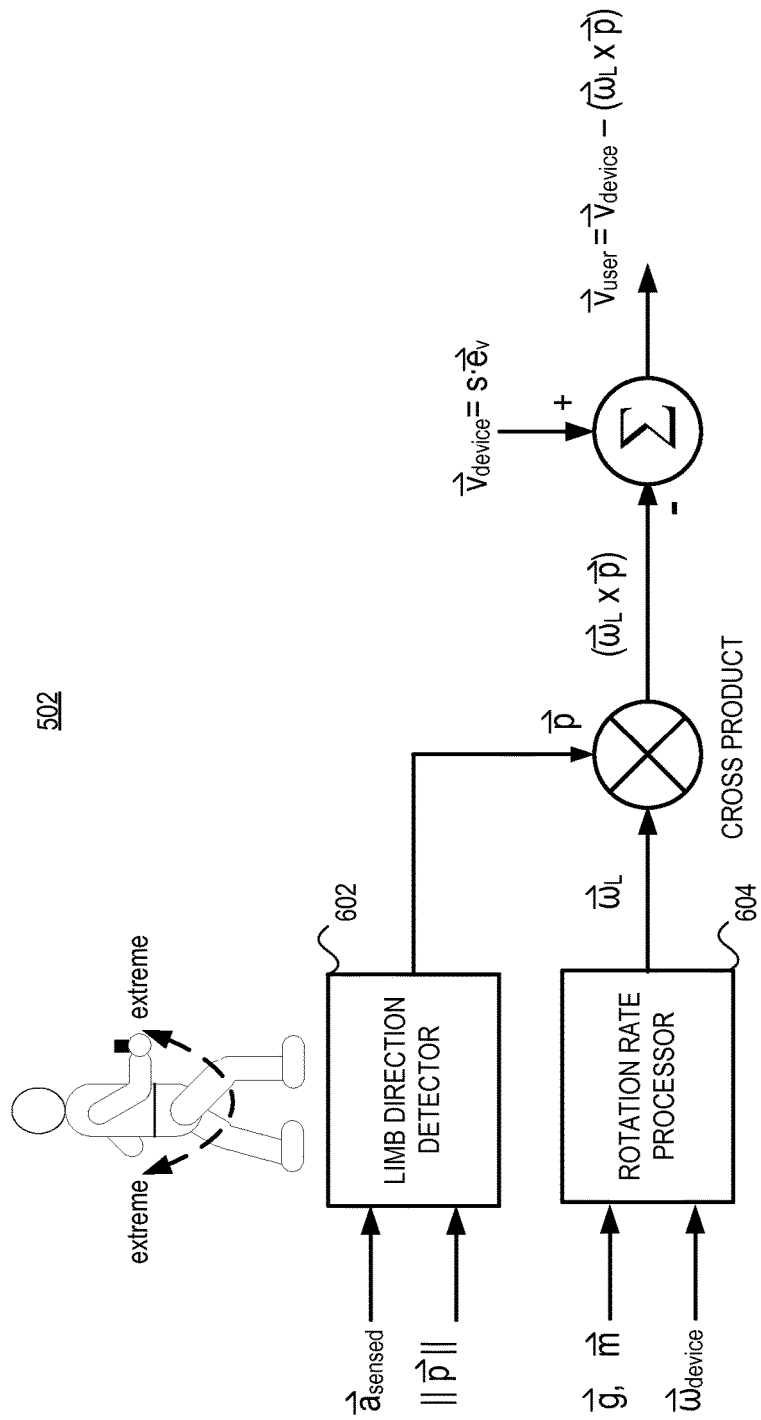
FIG. 6 is a block diagram of the example motion model shown in FIG. 5, according to an implementation.

FIG. 6 is a block diagram of the example motion model shown in FIG. 5, according to an implementation.

In some implementations, pedestrian motion model 502 can include limb direction detector 602 and rotation rate processor 604. Sensed acceleration vector $\vec{a}_{sensed}$ is input into limb direction detector 602. Sensed acceleration vector is, for example, an acceleration vector formed from the outputs of accelerometers (with gravity subtracted out).

Limb direction detector 602 determines extreme limb directions in the sensed acceleration data, which occur at the terminus points in the swing path of the limb (See FIG. 1). Limb direction detector 602 can use interpolation techniques to determine a unit vector $\vec{e}_p$ that represents the actual limb direction. This unit vector is multiplied by the length of the limb $\|\vec{p}\|$ to provide the limb position vector $\vec{p} = \|\vec{p}\| \cdot \vec{e}_p$. In some implementations, linear or spherical linear interpolation is used to interpolate between the terminus points. A cross product of the limb rotation rate vector $\vec{\omega}_L$ and the limb position vector $\vec{p}$ is calculated and subtracted from the device velocity $\vec{v}_{device}$ to give the user velocity $\vec{v}_{user}$.

In some implementations, the user rotation rate vector $\vec{\omega}_{user}$ can be determined by subtracting out the rotation rate of the limb $\vec{\omega}_L$ by, for example, subtracting the periodic component from the measured device rotation rate $\vec{\omega}_{device}$, since the limb rotation rate in most cases only introduces periodic motion and is typically the largest source of periodic motion. The subtraction can be performed in the time domain by, for example, applying a bandpass filter to $\vec{\omega}_{device}$ to allow only signal components that are periodic with frequencies related to the swinging limb. The remaining measured rotation after subtracting the periodic component is substantially the user rotation rate $\vec{\omega}_{user}$, as if it were measured by a body-fixed device.

In some implementations, interpolation to determine $\vec{e}_p$ can be performed as follows. First, determine the fundamental frequency of periodicity of the limb swing in rate gyro data. Since the motion is periodic, the device will necessarily return to its original orientation (i.e. undergo no net rotation) if the rate gyros are numerically integrated over one fundamental period. Assume all the rotation is due to limb swing and planar, as if the limb were a pendulum. Next, integrate the magnitude of rotation over one fundamental period, noting the maximum and minimum angles, $\Delta\theta_{max}$ and $\Delta\theta_{min}$ relative to the start of the numerical integration. Assume maximum rotation away from vertical (rotation amplitude A) is the same in the forward and backward swing directions and equal to half of $(\Delta\theta_{max} - \Delta\theta_{min})$. Model the direction of the limb as the direction of the gravity vector rotated toward the current direction of user travel by an angle $\theta(t)$, where $\theta(t) = A \cdot \sin(f_o \cdot t - t_o)$ and $t_o$ is some time in the past at which the limb was previously vertical (i.e. was roughly halfway in between extreme limb directions).

Example Process

Figure 7:
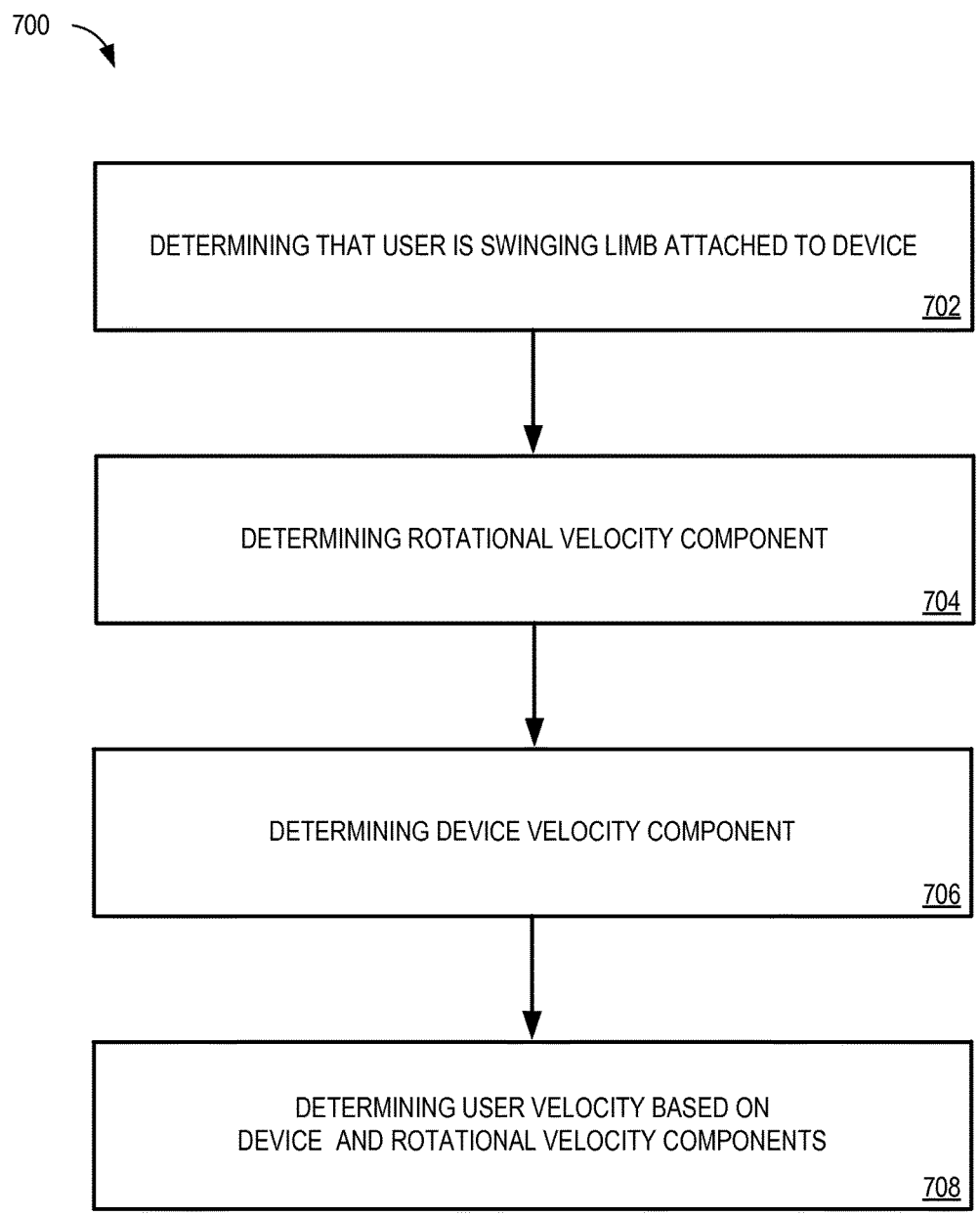
FIG. 7 is a flow diagram of an example process for device state estimation under periodic motion, according to an implementation.

FIG. 7 is a flow diagram of an example process 700 for device state estimation under pedestrian motion with swinging limb, according to an implementation. Process 700 can be implemented by mobile device architecture 800, as described in reference to FIG. 8.

In some implementations, process 700 can begin by determining that the user is swinging a limb attached to the device (702). For example, a motion activity class signal can be generated based on analysis of periodicity strength (energy levels in the frequency domain) in accelerometer and rate gyroscope data to determine that the user is walking and swinging a limb attached to the device, as described in reference to FIG. 3.

Process 700 can continue by determining a rotational velocity component (704). For example, a rotation velocity component due to limb swing can be determined from $(\vec{\omega}_L \times \vec{p})$, where $\vec{\omega}_L$ is a limb rotation rate vector and $\vec{p}$ is a limb position vector from the center of rotation of the limb (e.g., a shoulder or hip) to the device, as described in reference to FIG. 5.

Process 700 can continue by determining a device velocity (706). For example, device velocity can be obtained from a device state estimator, as described in reference to FIGS. 5 and 6.

Process 700 can continue by determining user velocity based on the device velocity and the rotation velocity due to the swinging limb (708). For example, the user velocity can be determined according to equation [4], as described in reference to FIG. 5.

Example Device Architecture

Figure 8:
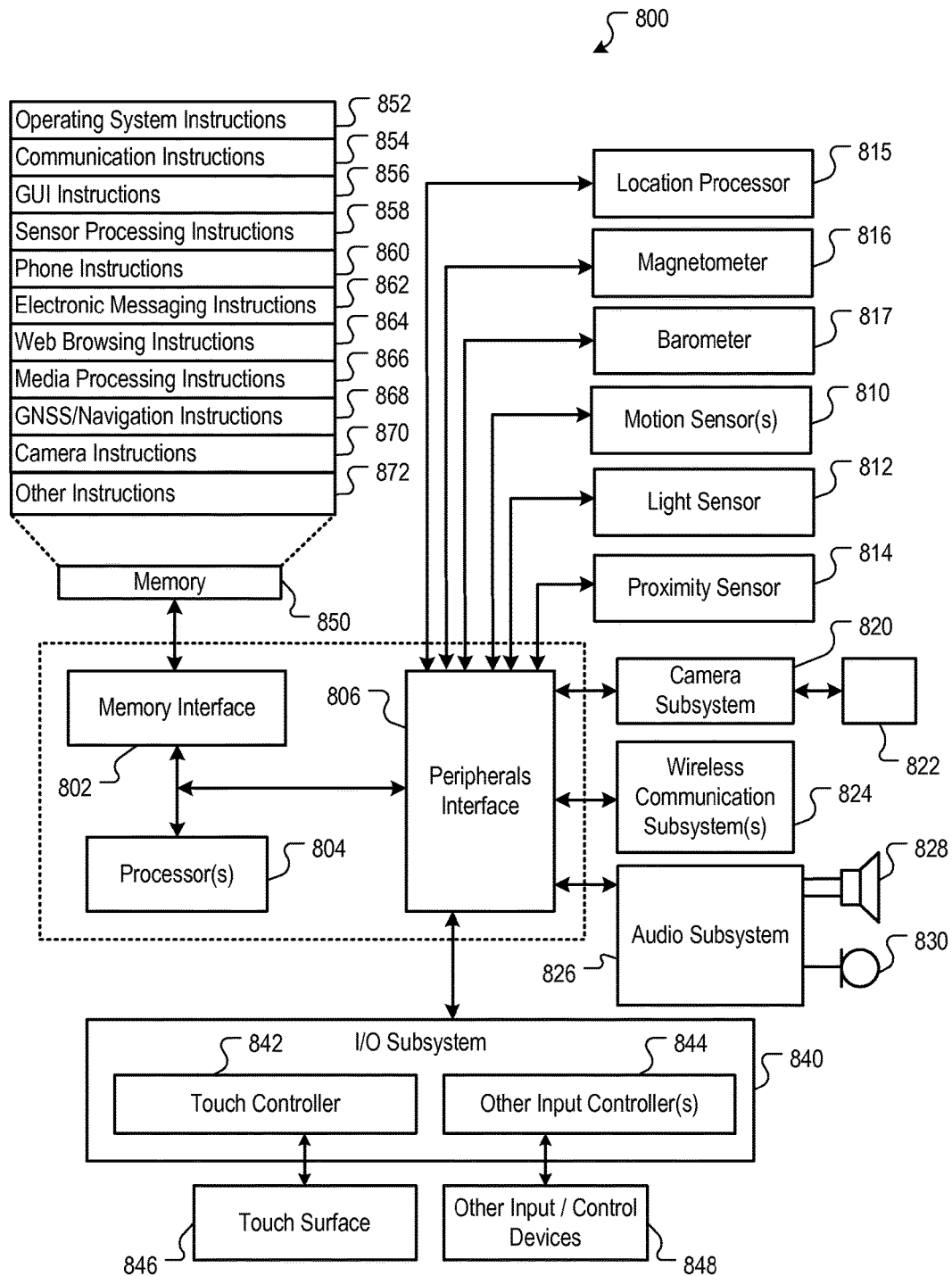
FIG. 8 is a block diagram of example device architecture for implementing the features and processes described in reference to FIGS. 1-7.

FIG. 8 is a block diagram of example device architecture 800 for implementing the features and processes described in reference to FIGS. 1-7. Architecture 800 may be implemented in any mobile device for generating the features and processes described in reference to FIGS. 1-7, including but not limited to smart phones and wearable computers (e.g., smart watches, fitness bands). Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functionalities. For example, motion sensor 810, light sensor 812, and proximity sensor 814 may be coupled to peripherals interface 806 to facilitate orientation, lighting, and proximity functions of the device. For example, in some implementations, light sensor 812 may be utilized to facilitate adjusting the brightness of touch surface 846. In some implementations, motion sensor 810 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 806, such as a temperature sensor, a barometer, a biometric sensor, or other sensing device, to facilitate related functionalities. For example, a biometric sensor can detect fingerprints and monitor heart rate and other fitness parameters.

Location processor 815 (e.g., GNSS receiver chip) may be connected to peripherals interface 806 to provide georeferencing. Electronic magnetometer 816 (e.g., an integrated circuit chip) may also be connected to peripherals interface 806 to provide data that may be used to determine the direction of magnetic North. Thus, electronic magnetometer 816 may be used as an electronic compass.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, and telephony functions.

I/O subsystem 840 may include touch controller 842 and/or other input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons and a virtual keyboard, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

In some implementations, architecture 800 may present recorded audio and/or video files, such as MP3, AAC, and MPEG video files. In some implementations, device 800 may include the functionality of an MP3 player and may include a pin connector for tethering to other devices. Other input/output and control devices may be used.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications. Communication instructions 854 may also be used to select an operational mode or communication medium for use by the device, based on a geographic location (obtained by the GPS/Navigation instructions 868) of the device.

Memory 850 may include graphical user interface instructions 856 to facilitate graphic user interface processing, including a touch model for interpreting touch inputs and gestures; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes; camera instructions 870 to facilitate camera-related processes and functions; and other instructions 872 for performing some or all of the features and processes, as described in reference to FIGS. 1-7.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, by a device, that the device is attached to a swinging limb based on a sensor signal;
   determining, by the device, a rotational velocity component of device velocity due to the swinging limb based on the sensor signal and a limb position vector;
   estimating, by the device, device velocity using a global navigation satellite (GNSS) velocity or velocity determined from wireless signals transmitted by a wireless network; and determining, by the device, a user velocity by excluding the rotational velocity component from the device velocity.

2. The method of claim 1, wherein determining that the device is attached to a swinging limb based on the sensor signal, further comprises:
   detecting periodicity in the sensor signal; and
   determining that the device is attached to the swinging limb based on the detected periodicity in the sensor signal.

3. The method of claim 1, wherein determining that the device is attached to a swinging limb based on the sensor signal, further comprises:
   detecting a first periodicity in device acceleration data;
   detecting a second periodicity in device orientation data; and
   determining that the device is attached to the swinging limb based on a relative strength of the first or second periodicities.

4. The method of claim 1, wherein determining a rotational velocity component due to the swinging limb based on the sensor signal and limb parameters, further comprises:
   determining a limb rotation rate vector in a reference coordinate frame;
   determining a swinging limb position vector in the reference coordinate frame; and
   determining the rotational velocity component based on a cross product of the limb rotation rate vector and the swinging limb position vector.

5. The method of claim 4, wherein one or more of the swinging limb parameters are estimated by a device state estimator.

6. The method of claim 4, wherein determining a swinging limb position vector in the reference coordinate frame further comprises:
   determining terminus points of a swing path of the limb; and
   interpolating between the terminus points to determine the swinging limb position vector.

7. The method of claim 1, wherein one of the swinging limb parameters is a limb length that is obtained from user input.

8. The method of claim 1, wherein determining user velocity based on the velocity of the device and the rotational velocity component uses the formula, $$\vec{v}_{user} = \vec{v}_{device} - \vec{v}_{rotation} = \vec{v}_{device} - (\vec{\omega}_L \times \vec{p}),$$

where $\vec{v}_{user}$ is the user velocity, $\vec{v}_{device}$ is the device velocity, $\vec{\omega}_L$ is a limb rotation rate vector and $\vec{p}$ is a limb position vector.

9. The method of claim 1, wherein the user velocity is used to update a device state estimator between measurement time epochs.

10. The method of claim 9, where the update occurs at time indicated by a trigger signal or schedule based on a periodicity feature detected in the sensor signal.

11. A device comprising:
   one or more sensors;
   one or more processors;
   memory coupled to the one or more processors and configured to store instructions, which, when executed by the one or more processors, causes the one or more processors to perform operations comprising:
      determining that the device is attached to a swinging limb based on a sensor signal;
      determining a rotational velocity component of device velocity due to the swinging limb based on the sensor signal and a limb position vector;
      estimating device velocity using a global navigation satellite (GNSS) velocity or velocity determined from wireless signals transmitted by a wireless network; and
      determining a user velocity by excluding the rotational velocity component from the device velocity.

12. The device of claim 11, wherein determining that the device is attached to a swinging limb based on the sensor signal, further comprises:
   detecting periodicity in the sensor signal; and
   determining that the device is attached to the swinging limb based on the detected periodicity in the sensor signal.

13. The device of claim 11, wherein determining that the device is attached to a swinging limb based on the sensor signal, further comprises:
   detecting a first periodicity in device acceleration data;
   detecting a second periodicity in device orientation data; and
   determining that device is attached to the swinging limb based on a relative strength of the first and second periodicities.

14. The device of claim 11, wherein determining a rotational velocity component due to the swinging limb based on the sensor signal and limb parameters, further comprises:
   determining a limb rotation rate vector in a reference coordinate frame;
   determining a swinging limb position vector in the reference coordinate frame; and
   determining the rotational velocity component based on a cross product of the limb rotation rate vector and the swinging limb position vector.

15. The device of claim 14, wherein one or more of the swinging limb parameters are estimated by a device state estimator.

16. The device of claim 14, wherein determining a swinging limb position vector in the reference coordinate frame further comprises:
   determining terminus points of a swing path of the limb; and
   interpolating between the terminus points to determine the swinging limb position vector.

17. The device of claim 11, wherein one of the swinging limb parameters is a limb length that is obtained from user input.

18. The device of claim 11, wherein determining user velocity based on the velocity of the device and the rotational velocity component uses the formula, $$\vec{v}_{user} = \vec{v}_{device} - \vec{v}_{rotation} = \vec{v}_{device} - (\vec{\omega}_L \times \vec{p}),$$

where $\vec{v}_{user}$ is the user velocity, $\vec{v}_{device}$ is the device velocity, $\vec{\omega}_L$ is a limb rotation rate vector and $\vec{p}$ is a limb position vector.

19. The device of claim 11, wherein the user velocity is used to update a device state estimator between measurement time epochs.

20. The device of claim 19, where the update occurs at time indicated by a trigger signal or schedule based on a periodicity feature detected in the sensor signal.

* * * * *